H. DLUGACH.
MEANS FOR RETAILING GOODS BY SAMPLES.
APPLICATION FILED MAR. 29, 1918.
1,377,813.
Patented May 10, 1921.
2 SHEETS—SHEET 1.
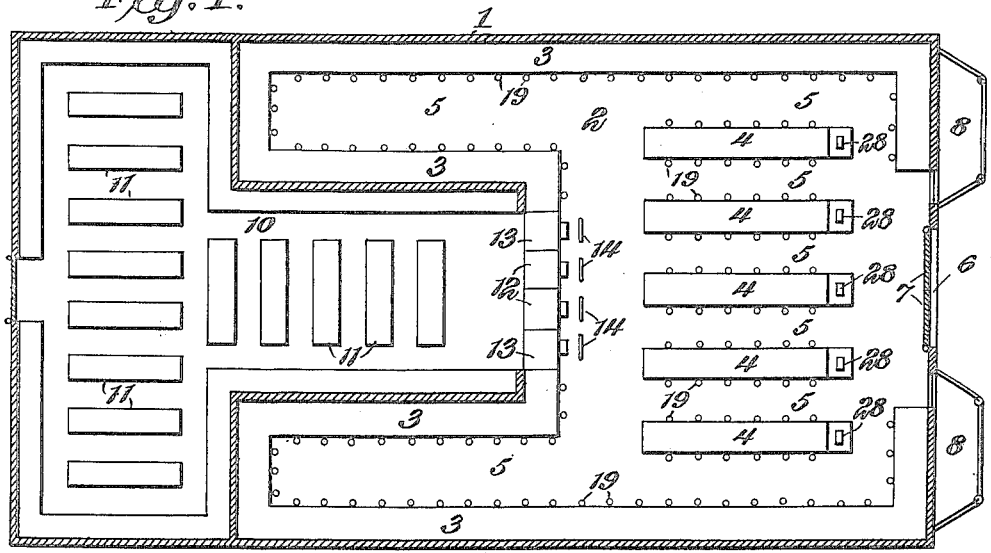
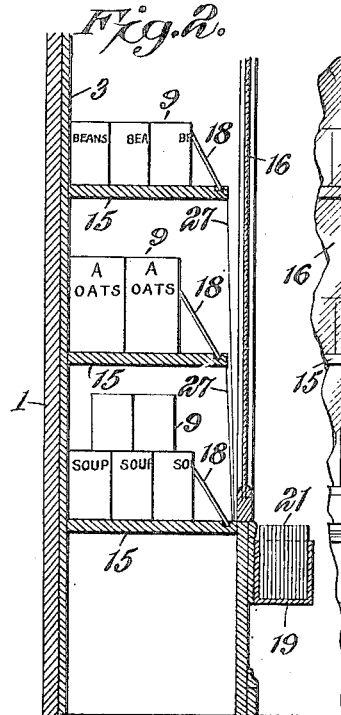
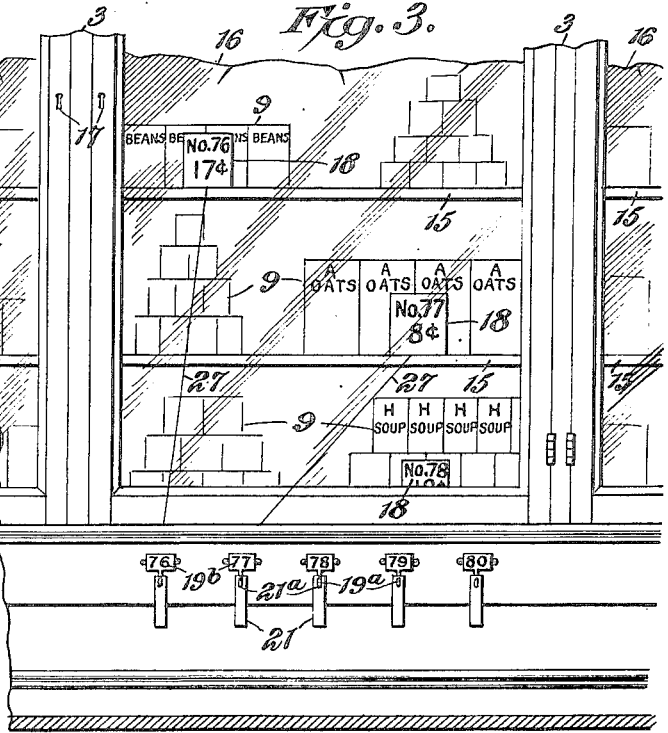
WITNESSES
Howard D. Orr.
H. T. Chapman.
INVENTOR,
Harry Dlugach,
BY
E. G. Siggers,
ATTORNEY H. DLUGACH.
MEANS FOR RETAILING GOODS BY SAMPLES.
APPLICATION FILED MAR. 29, 1918.
1,377,813.
Patented May 10, 1921.
2 SHEETS—SHEET 2.
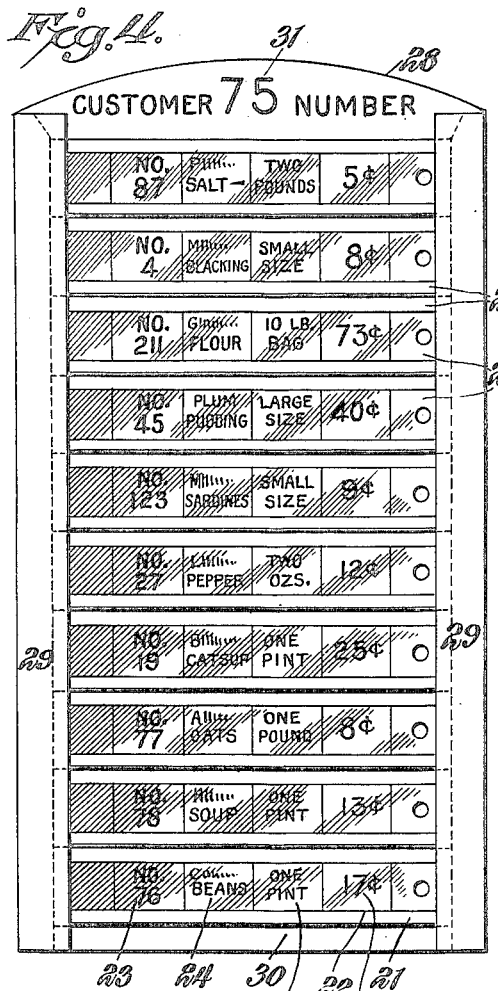
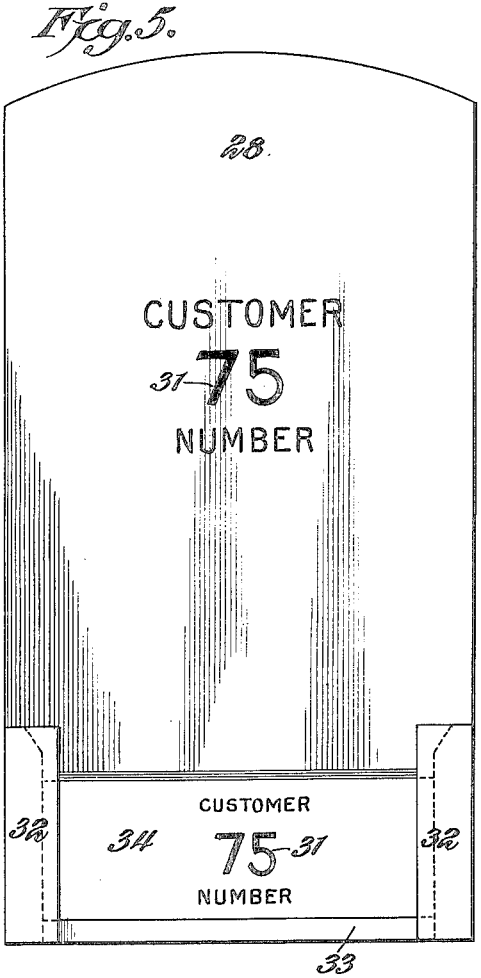
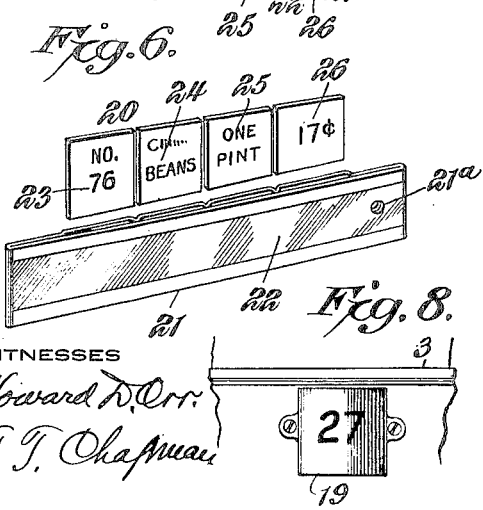
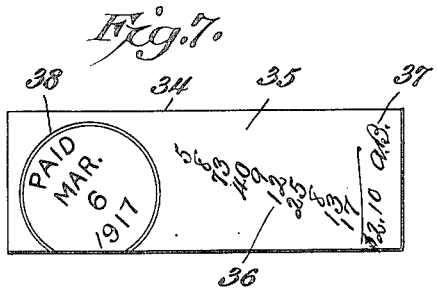
WITNESSES
Howard D. Orr
H. T. Chapman
Harry Dlugach, INVENTOR,
BY E. G. Siggers
ATTORNEY

UNITED STATES PATENT OFFICE.

HARRY DLUGACH, OF MEMPHIS, TENNESSEE.

MEANS FOR RETAILING GOODS BY SAMPLES.

1,377,813. Specification of Letters Patent. Patented May 10, 1921.

Application filed March 29, 1918. Serial No. 225,569.

*To all whom it may concern:*

Be it known that I, HARRY DLUGACH, a citizen of the United States, residing at Memphis, in the county of Shelby and State of Tennessee, have invented certain new and useful Improvements in Means for Retailing Goods by Samples, of which the following is a specification.

This invention has reference to a means for retailing goods by samples, and its object is to obviate the necessity of providing a large number of clerks to wait on customers, but cause the customers to select from samples the goods desired and present an order therefor which may be quickly filled.

The invention comprises a mode of display of the goods by sample, which in some instances may be dummy samples, and of designation of the samples, whereby a customer on making a choice from the displayed samples, without disturbing the latter, may make up and present an order by using already prepared tickets associated with the displayed samples and accessible to the customer, which order is subsequently filled by stock clerk or clerks and delivered to the customer on the presentation of a receipt furnished by a cashier to whom the amount of the order is first paid.

While the invention is applicable to the retailing of various kinds of goods, it is particularly applicable for use in stores where the goods sell for small amounts, as in five and ten cent stores and where the overhead charges are usually large because of the very large number of salespeople needed and where the margin of profit on the individual sales is small.

The invention, by limiting the display of goods to samples, correspondingly reduces the necessary space, and by eliminating salespeople greatly reduces the handling expenses and eliminates many incidental expenses, wherefore, it is feasible to attract and increase business by favorable prices, and, although, by such procedure, the individual profits may be reduced, the aggregate profit may be materially increased to the benefit of both the merchant and the customer. Moreover, the floor space required, especially for the display of goods is very materially reduced and such saving in floor space permits the increase of storage or stock room space.

The invention has a further advantage in that a card system contemplated by the invention also serves for stock and cash accounting with a material saving in labor and the number of employees required, thereby in such particular reducing overhead expenses.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is a more or less schematic plan view of a store for retailing goods with the walls in cross section and showing a stock room associated with the display room.

Fig. 2 is a vertical front to rear section of an upright show case.

Fig. 3 is a face view of the show case indicated in Fig. 2, but with a different form of ticket holder.

Fig. 4 is a face view of a customer's or shopping card with chosen descriptive tickets of the goods desired inserted in the card.

Fig. 5 is a reverse face view of the card of Fig. 4.

Fig. 6 is a perspective view, with the parts separated, of a descriptive ticket and a container therefor to be inserted in the customer's or shopping card of Figs. 4 and 5.

Fig. 7 is a face view of a receipt furnished to the customer by the cashier to be presented to the packer for the chosen goods after they are assembled and wrapped.

Fig. 8 is a face view of one form of ticket holder.

Referring to the drawings, there is shown a building 1 without any attempt to indicate any particular style or arrangement of building and in this building there is indicated a room 2 with show cases 3 about its walls and other show cases 4 separated from the show cases 3 and from each other by aisles 5. The building 1 is indicated as provided with an entrance 6 having doors 7 as is customary and the front of the building may have show windows 8 in accordance with the usual custom.

The room 2 with the show cases 3 and 4 constitutes a display room for samples 9 of goods which may be purchased in the store and for this reason the room 2 may be termed a show room. Associated with the show room 2 is a packing room 10 with tables 11 or other means on which goods may be assembled and wrapped. Part of the tables 11 may be utilized for holding the stock of goods or such stock of goods may be stored elsewhere, say on the floors of the building above or below the display room 2.

The packing room 10, in the particular arrangement shown in Fig. 1, has a reduced portion to project more or less into the display room 2 and at a convenient point there are located in said reduced portion cashiers' windows 12 and packers' windows 13, the packers' windows being arranged for the delivery of the assembled and packed goods to the customer. Each window may be provided with a travel-directing railing 14, but this is a feature which may be adopted or omitted as desired.

It will be understood that no attempt is made in the drawings to show any particular arrangement of the display and stock rooms for these parts of the system are susceptible of a great variety of arrangements, the showing of the drawings being deemed sufficient for explaining the working of the invention.

Each show case 3 or 4, as the case may be, may be provided with shelves 15 in which the samples 9 are located, and these samples may be real samples or may be dummy samples, especially of packaged goods where the goods themselves are selected in the packages and are designated by labels only. Of course, certain classes of goods are not so packaged and, in such case, the samples are real articles.

To make an attractive display, a suitable number of samples, whether dummy or real, of the goods, may be artistically grouped to make the display attractive to the customer. These are matters which do not necessarily affect the invention and may be varied in accordance with circumstances or the desires of the manager of the store.

In order that the goods may be properly displayed, upright show cases are provided with glass doors 16, each of which is furnished with a lock which may be considered as indicated at 17, a keyhole being all that is shown in Fig. 3 where such lock would be found.

Certain of the show cases may be of flat variety where floor space is available or all the show cases may be of the upright kind.

Each sample or group of samples where more than one sample of a kind is displayed, is furnished with a card 18 having some designating mark, such as a number, and also displaying the price of the goods represented by the sample. At a convenient point in conjunction with each show case and within easy reach of a customer is a container 19 for tickets 20, each of which is made up of a number of separate units located in an envelop 21 having a transparent face 22. On one unit of the ticket 20 is a number 23 corresponding to the number of the sample on the shelf of the show case and to which the particular ticket 20 is to apply. Another unit of the ticket 20 may have thereon a descriptive name 24 of the goods represented by the sample. Another unit of the ticket may be provided with a word or words 25 indicating the quantity of material represented by the sample. Still another unit of the ticket 20 contains a designation 26 showing the price of the goods represented by the sample. The ticket 20 therefore contains all the information needed for filling the customer's order with respect to the one sample and this ticket is located in the envelop 21 with the printed matter on the ticket visible through the transparent portion 22 of the envelop so that the tickets, one of which is shown separately in Fig. 6, may be used repeatedly without becoming soiled by such repeated handling.

In some cases the accessible tickets in a container 19 may be so closely associated with the displayed sample or samples that there is no difficulty for the customer to locate the proper ticket. In other cases the sample may be so far distant from the container 19 that the two are not readily associated by the customer. In such case, an eye directing strand 27 leads from the sample or group of samples to the container 19 in such manner that where the container has several groups of tickets in it and so represents several samples on the shelves, each strand 27 leads to the particular part of the container having therein the tickets belonging to the particular sample. Both the samples and the strands 27 are arranged within the particular show case out of reach of the customer, but the container 19 with the envelops 21 containing the proper tickets 20, is located outside of the show case so as to be readily accessible to the customer.

In Figs. 4 and 5 there is shown a card or holder 28 of a size to receive and hold a considerable number of the envelops 21 with multiple tickets 20 therein. The card has marginal channels 29 facing each other so as to hold the envelops 21 with the tickets therein and at one end of the card 28, which may be considered as the bottom end thereof, is a stop strip 30, wherefore, the envelops 21 may be inserted in the channels at what may be considered the top of the card.

On the face of the card containing the channels 29 there may be printed a number 31 and this number may be designated "Customer number" by suitable printing adjacent to the number 31. On the reverse face of the card the same designation "Customer number" and the same number 31 occurs. Furthermore, edge channels 32 are provided on the reverse face of the card near the lower end thereof and a stop strip 33 corresponding to the stop strip 30 is also provided. The channels 32 are designed to receive a strip 34 containing on one face the designation "Customer number," or an expression of like effect and also the same number 31 as before, such number in the particular showing of Figs. 4, 5 and 6 being the numeral 75, but it will of course be understood that any other numeral may appear.

The strip 34 has a plain opposite face, indicated at 35 in Fig. 7, and this face is utilized for placing in column form the price numbers appearing on the chosen tickets 20 inserted in the customer's or shopping card 28. Such column of prices is indicated at 36 in Fig. 7, being placed thereon by the cashier together with the sum of these figures, and the cashier's initials appearing at 37 in Fig. 7. When the customer has paid to the cashier the proper sum, the cashier impresses a suitable stamp 38 on the strip 34 so that the strip becomes a receipt to the customer to be presented at a packer's window 13, whereupon, the chosen goods are delivered by the packer to the customer. The windows 13 may be so arranged that the customer has the opportunity of watching the packer wrapping up the goods and so has evidence that the goods paid for are all contained within the package.

The strip 34 is preserved and serves for cash accounting. The cards 28, which are surrendered to the cashier and delivered by the latter to the packer may be utilized for stock accounting and after having served such purpose the envelops 21 with the tickets 20 therein are removed from the customer's or shopping card 28 and are distributed to the proper receptacles 19, this being facilitated by the number 23 on the ticket and may be further facilitated by having the tickets of different colors, each color, if desired, representing a different portion of the salesroom.

The customer's card 28 may be contained in suitable receptacles within the display room adjacent to the entrance 6 so that customers on entering the salesroom may help themselves to the customer's or shopping cards 28, placing appropriate tickets 20 in these cards as articles are chosen from the display samples 9. When the choice is completed the customer proceeds to a cashier's window, pays the bill and receives a receipt, while the cashier delivers the card 28 with the tickets 20 therein to a packer who thereupon collects the various articles called for by the tickets and wraps them up and finally delivers them to the customer on the presentation of the receipt shown in Fig. 7.

The invention has the advantage of saving display room, since only samples, in many instances a single sample, of goods need be or is displayed. The invention also greatly reduces running expenses, since no sales-people are needed. The invention also saves time to a customer, since there need be no delay in waiting for a clerk to get through with a previous customer. The invention saves losses from breakage through the handling by customers and from shoplifting, as well as losses due to soiling of goods by handling. The invention saves dead investment in stock, since the displayed samples may in large part be dummies. The invention automatically facilitates stock and cash accounting. The invention has the advantage of permitting the merchant to attract trade by selling goods at a material reduction in price without sacrifice of profit needed to maintain a business where the goods are sold by clerks, and to increase the aggregate of profits because of the increased trade due to the permissible attractive prices offered.

It has already been herein stated that the invention is particularly adaptable to stores retailing a large variety of small or cheap articles, such as found in the familiar five and ten cent stores, but it is to be understood that the invention is well adapted to selling other goods which may be successfully displayed by samples and chosen from such samples, such as dry groceries, various package goods, and various articles either in packages or in bulk.

While the cards or tags displayed with the sample have been described as provided with appropriate numbers together with prices, and the companion tickets accessible to the customer have been described as provided with numbers corresponding to the price tags or tickets associated with the samples, it will be understood that any other appropriate designating indicia may be used instead of numbers.

By providing multiple tickets 20 with the units separate and a compartment envelop for containing them to produce an effectively single ticket, the units may be assembled in any group desired so that the indicia may be changed as may be needed and the price marks may be changed. By sealing the envelops containing the ticket units any tampering with these tickets may be prevented for tampering would be at once discovered.

No claim is herein made for the customer's or shopping card and associated tickets, since these features are made the subject of another application Serial Number 225,568, filed March 29, 1918, for shopping card for use in retailing goods by sample.

It may be found advisable, in practice, to hang the tickets 20 upon hooks or similar supports or holders instead of depositing them in containers, like the containers 19 shown in Figs. 2 and 8. Such hooks are illustrated at 19ª in Fig. 3, and each hook is provided with a plate 19ᵇ on which is displayed a number corresponding to the number of the goods represented by the ticket. This enables the customer to readily identify the tickets with the goods upon the shelves or wherever they may be placed. When the tickets are arranged for being held by hooks, in which case the hooks are large enough to hold a suitable number of tickets, each ticket has a hole 21ª through one end of its envelop 21.

What is claimed is:—

1. A means for selling goods at retail by samples, comprising means for displaying samples in a display room in positions where the samples are readily visible but inaccessible to a customer, loose tickets directly associated with and individual to and having matter thereon identifying the samples, said tickets being accessible to the customer, and a device accessible to and having matter thereon identifying the customer, and of a size to be carried in the hand of a customer, said device being arranged to receive the various tickets chosen by the customer and to hold them in assembled relation.

2. A means for retailing goods by samples, comprising means for displaying samples in a display room in readily visible positions but inaccessible to a customer, holders located in juxtaposition to said samples, loose tickets contained within said holders and readily removable therefrom by the customer, said tickets being individual to the samples and having printed matter thereon identifying the goods represented by the samples, and a customer's ticket holder also readily accessible to a customer and having matter thereon to identify the customer and of a size to be carried in the hand of a customer, said ticket holder retaining the variout tickets chosen by the customer, which tickets designate the goods desired to be purchased.

3. A means for retailing goods by samples, comprising a means for displaying the samples in a display room in readily visible but inaccessible positions with respect to the customers, loose tickets directly associated with and individual to and having printed matter thereon identifying the goods represented by the samples, holders located in juxtaposition to said samples to receive said tickets so that the latter are readily accessible to the customer, each ticket containing the price and the quantity of the goods, a customer's ticket holder accessible to a customer and having arbitrary indicia to identify the customer and of a size to be carried in the hand of a customer so as to hold the various tickets chosen by the customer and thus designate the goods to be purchased, said customer's ticket holder also carrying a receipt slip separate from the tickets, said receipt slip also having arbitrary indicia to identify the customer.

4. A means for retailing goods by samples, comprising a display room with samples of the goods on sale, the samples being visible but protected from access by customers, each sample having a price tag with identifying indicia visibly displayed to the customers, loose tickets separate from the price tag and mounted in holders in juxtaposition to said samples, said tickets being readily accessible to the customers so as to be withdrawn by them separately, each ticket having matter thereon corresponding to the identifying indicia accompanying each sample, said matter including the price and quantity, thereby identifying the ticket with the goods represented by a sample to which the ticket is individual, and a customer's ticket holder accessible to a customer and of a size to be carried in the hand of the customer for receiving and retaining a plurality of tickets chosen and inserted therein by the customer, said last-mentioned holder having matter thereon for identifying the customer, whereby the tickets within the holder show the articles purchased and may be used in filling the order in the stock room and entering the purchase by the cashier.

5. A means for retailing goods, comprising a display room with readily visible samples of the goods on sale protected from access by customers, each sample having a price tag with identifying indicia visibly displayed to the customers, and loose tickets separate from the price tags and located in juxtaposition to said samples, said tickets being readily accessible to the customers to be withdrawn by them, each ticket being individual to a sample and identifying the goods represented by a sample by the same indicia appearing on the price tag, including the price and quantity.

6. A store for the vending of merchandise having a display room with samples of the goods on sale, the samples being visible but protected from access by customers, each sample having price tags with identifying indicia visibly displayed to customers, holders located in juxtaposition to said samples to receive loose tickets identifying the samples, an assembly and packing room separate from the display room, and cashier's window and a packer's window accessible to the customers while in the display room.

7. A store for the vending of merchandise having a display room with samples of the goods on sale, the samples being visible but protected from access by customers, each sample having price tags with identifying indicia visibly displayed to customers, holders located in juxtaposition to said samples to receive loose tickets identifying the samples, an assembly and packing room separate from the display room and having a reduced portion projecting into the display room, and a cashier's window and a packer's window accessible to the customers while in the display room, and located in said reduced portion.

In testimony whereof I affix my signature.

HARRY DLUGACH.